United States Patent Office 2,971,032
Patented Feb. 7, 1961

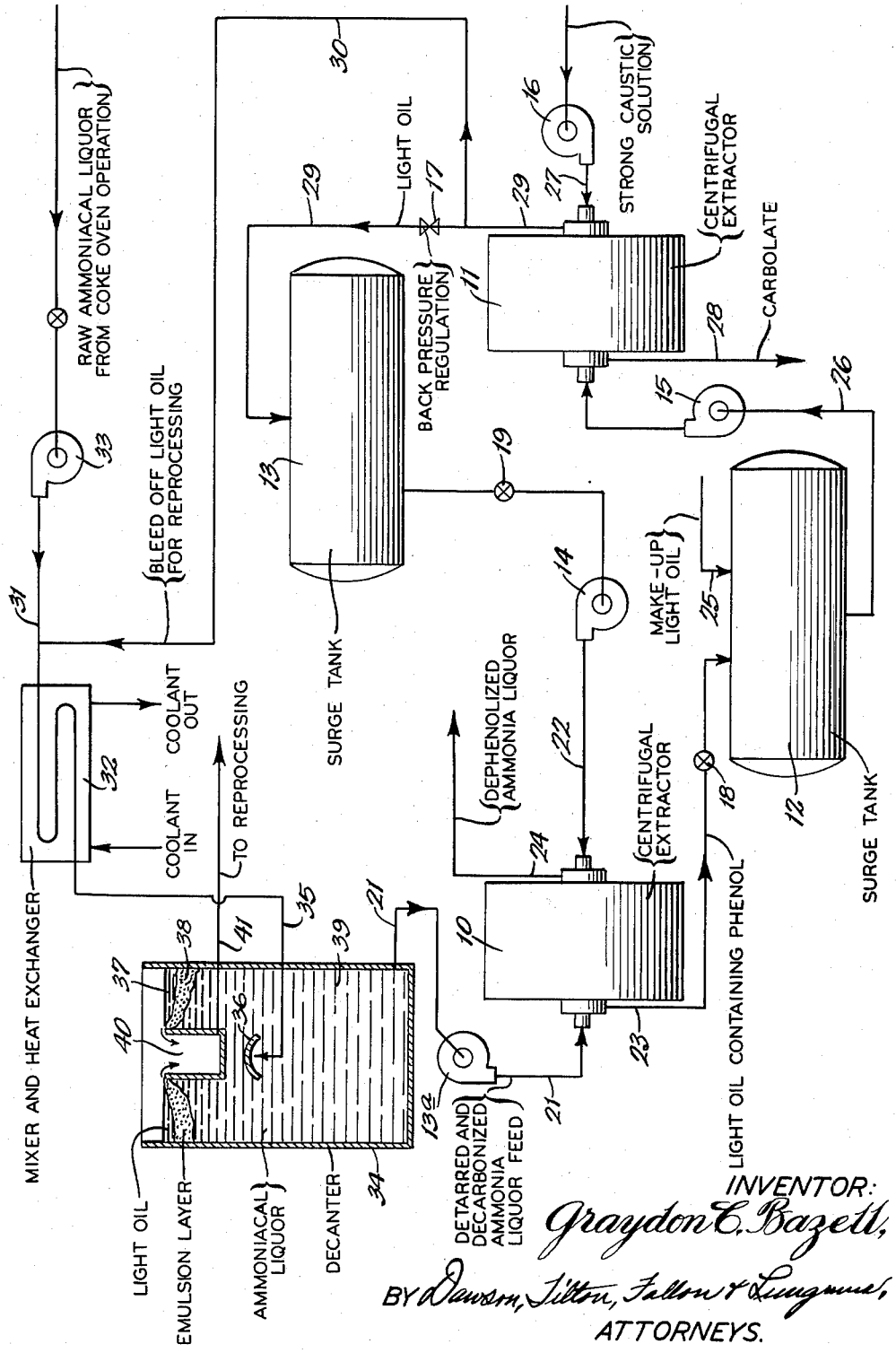

2,971,032
METHOD OF PREPARING A COKE PLANT AMMONIACAL LIQUOR FOR PROCESSING IN CENTRIFUGAL EXTRACTORS TO RECOVER PHENOL

Graydon C. Bazell, Park Forest, Ill., assignor, by direct and mesne assignments, to Walter J. Podbielniak Filed Dec. 18, 1957, Ser. No. 703,572
3 Claims. (Cl. 260—627)

As indicated by the title, this application relates primarily to a method of preparing a coke plant ammoniacal liquor for processing in centrifugal extractors to recover phenol. As will be seen from the following detailed description, however, the method is applicable in the processing of other aqueous solutions containing suspended solids such as carbon and/or tar particles. Generally speaking, the method of this invention provides a simple and efficient procedure for removing such contaminants. As will be seen from the following discussion, the method has particular utility for the pretreatment of ammoniacal liquors in conjunction with phenol extraction plants which are designed around centrifugal extractors. However, the method can also be employed advantageously for decarbonizing and/or detarring a coke plant ammonia liquor prior to the removal of phenol therefrom by means of extraction towers.

Dephenolization of coke plant ammoniacal liquors has been accomplished for many years in static type towers and gravitational mixer-settler tanks. The process employs a liquid-extraction system involving two principal steps. In the first step, a light oil (e.g. a mixture of benzol, toluol, and xylol, or sometimes benzol alone) is contacted countercurrently with the feed liquor. The phenols are eliminated from the liquor by contact with the solvent (immiscible in the liquor) due to the fact that phenol is more soluble in the solvent than in the liquor phase. In the second step, the phenols are removed from the solvent so that the dephenolized solvent can be returned to the first step to pick up more phenol. This is done by countercurrently contacting the phenolized solvent with a strong caustic (NaOH) solution.

In the first of the steps just described, difficulties are often encountered with interfacial emulsions which disrupt the operation by causing flooding of the contact columns. This, of course, tends to reduce the capacity of the equipment. In commercial practice, this difficulty has been combated by a make-up addition and withdrawal procedure from the solvent system. For example, it may be necessary to add to the phenol plant solvent system an amount of solvent equivalent to 100% of the coke plant production, adding and withdrawing this amount periodically.

Recently, a major improvement has been made in phenol recovery extraction systems through the use of centrifugal countercurrent solvent extractors of the type manufactured by Podbielniak, Inc., of Chicago, Illinois, as described in Auvil and Schmidt Patent 2,768,977, issued October 30, 1956. Among the many advantages of this improved system is a drastic reduction in required solvent inventory in the phenol plant. For example, hold-up in a typical system has been reduced from approximately 80,000 gallons to nearly 2,000 gallons or a reduction of 97%.

The reduction of solvent inventory, as just described, has resulted in several problems, which are becoming more apparent with the continued operation of phenol plants employing centrifugal extractors. These problems result from the fact that the entering liquor contains extremely fine particles or droplets of coal tar and carbonaceous materials. These particles may be aggregated, with the carbon particles embedded in larger masses of tar. The coal tar is soluble in the solvent and in a relatively short time the solvent is contaminated with tar and the system capacity is reduced. The dissolving of the tars liberates the carbon particles. The carbon particles tend to be retained in the interfacial emulsion which is formed in the solvent-liquor system.

As a result of these problems, it has become necessary to replace the circulating solvent at a rate sufficient to keep the tar and carbon content of the system at a tolerable level. For example, in a plant having a 2000 gallon solvent hold-up, it has been necessary to replace the circulating solvent at a continuous rate of about 2000 gallons per day. Even this expedient, however, does not entirely eliminate the undesirable effects of the carbon particles and dissolved tars in the recovery system. Frequent shutdowns of the plant for the cleaning of carbonaceous materials from the centrifugal extractor rotors are still required, and the carbolate product is discolored by contaminating tars.

It is therefore a principal object of the present invention to provide a method of substantially overcoming the problems just described. Most specifically, it is an object to provide a method for pretreating the ammoniacal liquors which will be effective in controlling the interference of the carbonaceous and/or tar contaminants in the phenol recovery system. Further objects and advantages will appear as the specification proceeds.

A typical embodiment of the present invention is illustrated in the diagrammatic flow sheet of the accompanying drawing. As shown in the flow sheet, the pretreatment method of the present invention is integrated with a phenol recovery plant employing centrifugal extractors. It may therefore be helpful in understanding the present invention to first describe the phenol recovery system that is illustrated in the lower portion of this flow sheet.

The primary apparatus components of the system are centrifugal extractors 10 and 11. For example, the extractors manufactured by Podbielniak, Inc., of Chicago, and sold under the trademark "Chemizon" may be employed. As illustrated in the drawing, the recovery system also includes surge tanks 12 and 13, pumps 13a, 14, 15 and 16 and the various control valves, such as valves 18 and 19. It will be understood that in commercial practice, all of the various pipelines of the system will be provided with suitable valves, but that for sake of simplicity a number of the valves have been omitted from the flow sheet.

In the operation of the system, the feed liquor is supplied to extractor 10 through line 21 by means of pump 13a. The light oil is also supplied to extractor 10 by pump 14 through line 22. The liquor being the heavy phase is supplied to the inner portion of the rotor, while the oil is supplied to the outer portion of the rotor. The countercurrent contacting occurs as these phases are respectively displaced inwardly and outwardly through the rotor passages, according to the well-known operating characteristics of centrifugal extractors. The light oil containing the extracted phenol is removed from the inner portion of the rotor through line 23, being passed to surge tank 12. The dephenolized ammonia liquor is withdrawn from the outer portion of the rotor through line 24.

To compensate for any light oil withdrawn from the circulating system, make-up light oil can be added to tank 12 through line 25. The phenol containing light oil in tank 12 is passed to extractor 11 through line 26 by means of pump 15. A strong caustic solution is supplied to extractor 11 through line 27 by means of pump 16. The caustic solution, being the heavy phase, is introduced into the inner portion of the rotor, while the oil is introduced into the outer portion of the rotor. During the counter-current contact between the caustic solution and the oil, the phenols (including phenol and its homologs) react with the sodium hydroxide to form carbolates (e.g. sodium phenolate). The carbolates accumulate in the heavy aqueous phase, being displaced outwardly in the rotor, and are removed with this phase through line 28. The dephenolized light oil is removed from the inner portion of the rotor and is passed to surge tank 13. From surge tank 13, the oil is recirculated through line 22 by means of pump 14 to rotor 10, thus completing the closed circuit for the light oil. In the illustration given, a portion of the light oil instead of being recirculated can be bled off through line 30 ahead of back-pressure regulator 17.

In the prior commercial operation of phenol recovery systems of the type just described, the bleed-off light oil, such as the oil removed through line 30, was passed directly to the coking plant for reprocessing with the volatile coke oven products. According to the present process, however, the bleed-off light oil is preferably first employed in the pretreatment of the raw ammoniacal liquor from the coke oven operation, as will now be described in detail.

In the illustration of the attached flow sheet, the light oil which is removed from the phenol recovery system through line 30 is pumped into a line 31 which communicates with a mixer and heat exchanger 32. The line 31 is also supplied with the raw ammoniacal liquor from the coke oven operation by means of a pump 33. The converging streams of light oil and raw liquor flow through the tortuous passages of the multi-pass exchanger 32 wherein these streams become intimately mixed, and then are passed as a single stream to decanter 34 through line 35. To reduce the velocity of the liquid as it is delivered from line 35 into decanter 34, the liquid can be discharged within the decanter beneath a dished splash-plate 36.

As illustrated in the attached flow sheet, the liquid body within decanter 34 due to gravitational settling will tend to maintain three more or less distinct phases, an upper light oil phase 37, intermediate emulsion layer phase 38 and a lower ammoniacal liquor phase 39. Preferably, means are provided for the removal of the aqueous phase 39 separately from the other two phases, and the level of the phases is controlled in the decanter to facilitate such separate removal. In the illustration given, the light oil phase and the emulsion phase are removed through overflowing into a weir box 40 and out through line 41. The aqueous phase is removed through line 21 which communicates with extractor 10.

In the preferred embodiment as illustrated in the drawing, the mechanics of the pretreatment process are believed to be as follows. In the heat exchanger and/or mixer 32, the suspended tars, being soluble in the light oil, tend to dissolve therein. This dissolving action liberates carbonaceous particles which were associated with the tars but unlike the tars are insoluble. The carbon particles upon liberation tend to become partially or completely coated with the emulsified light oil-liquor phase.

The mixer 32, or whatever equivalent mixing means is employed, has a further function. The light oil and feed liquor should be mixed sufficiently to produce a distinct third phase, that is, an oil-water emulsion. The presence of some dissolved tars in the oil is believed to be beneficial in promoting the formation of this emulsion. However, the light oil used in the pretreatment preferably has substantially no tar before it is mixed with the raw feed liquor.

Before proceeding further, perhaps a word should be said about the chemical composition of the feed liquor and the light oil. The composition of both of these liquids can vary considerably while still being quite suitable for use in the present invention. By way of specific example, however, the light oil may have the composition of the light oils which are customarily used in coke plant phenol recovery systems. More specifically, the light oil may be composed of benzol, toluol, xylol, or mixtures of these solvent oils in varying proportions. A typical light oil as used in the United States is usually a fraction of oils existing in coke oven gas, following treatment by various means to remove ammonia. These oils are recovered by a vapor-liquid contact system in which straw oil is used as the liquid phase and coke oven gas as the vapor phase. This fraction is steam stripped from the benzolized straw oil, and usually contains benzol, toluol, xylol and carbon disulfide as primary ingredients.

The ammoniacal liquor obtained from coke oven operations is an aqueous ammonia solution which is characterized by containing recoverable phenols. Normally, it will also contain a considerable quantity of entrained tars associated with fine carbon particles. These impurities may range from .05 to .2% of the liquor. It is, of course, these tar and carbon particles which it is the object of the present invention to partially or completely remove from the feed liquor before it is charged to the phenol extraction system. It should be noted that the terms "phenol" or "phenols" as used herein are intended to include the homologues of phenol such as cresols and xylols.

Returning to the description of the flow sheet, the liquid stream supplied to the decanter 34 through line 35 is preferably composed of three liquid phases, the phases at this point being dispersed or intermixed rather than separated. These three phases are the light oil phase, the emulsion phase, and the aqueous ammoniacal liquid phase. The liquid stream in line 35 will also contain suspended solids, which preferably are mostly the insoluble carbon particles which have become coated with the light oil, the soluble tar particles preferably having largely dissolved in the light oil phase. Thus, the feed to decanter 34 is actually composed of four phases, three liquid phases and one solid phase.

The decanter 34, as illustrated in the drawing, is designed to operate on a continuous basis. However, it will be readily apparent from the following description that the method of this invention can be adapted to either continuous or batch operation.

In order to achieve the maximum value of the present invention, it is desirable to introduce the unseparated feed mixture into the decanter 34 below the light oil and emulsion phases and while disturbing the established phase regions in the decanter as little as possible. In the illustration given, the mixture is released within the central portion of the aqueous phase region below plate 36.

As the unseparated feed mixture is introduced into the central portion of decanter 34, the heavier aqueous phase will tend to settle toward the bottom of the decanter. The oil phase being the lightest of the phases will tend to rise to the upper portion of the decanter. The emulsion phase will also tend to rise, although it has a density intermediate that of the aqueous phase and the oil phases. The emulsion-coated carbon particles will tend to follow the oil and emulsion phases, especially the emulsion phase. The emulsion phase due to its flocculent nature, appears to have a filtering action on the carbon particles. Consequently, as the portions of the emulsion phase rise within decanter 34, the carbon particles are swept out of the aqueous phase region and accumulate near the upper surface of the liquid within the decanter. The light oil phase (containing tars) and the emulsion phase (containing carbon particles) are continuously removed from the upper portion of the decanter through weir 40, which communicates with discharge line 41. This contaminated oil and emulsion mixture can easily be disposed of by passing it to the coke plant and introducing it into the condensate mains containing the partially condensed volatile products of the coking operation. In this way any valuable constituents (viz. light oil, phenol, coal tars, etc.) can be recovered. The decarbonized and detarred ammonia liquor feed can be removed from the lower portion of decanter 34 and supplied to extractor 10 for processing as previously described.

When operated in the preferred manner, the present invention can achieve substantially a complete removal of the carbon particles and tars from the raw ammoniacal liquor. This has the important advantage of making it unnecessary to shutdown the phenol extraction plant periodically to remove the accumulated carbon material from the centrifugal extractors. With certain feed liquors, an occasional cleaning of the extractors might still be desirable, but the problem of frequent, periodic cleanings has been overcome by the present invention.

Another advantage in the preferred embodiment of the present invention is that the low tar content of the oil tends to enhance its ability to extract phenol from the ammonia liquors without the excessive formation of an interfacial emulsion. While this type of emulsion is used to advantage in the pretreatment method of the present invention, it is highly disadvantageous in the phenol extraction system, tending to reduce the efficiency of the extraction, among other things.

Still another important advantage of the present invention is that the carbolate product (e.g. sodium phenolate) of the phenol recovery system has improved characteristics. This product formerly picked up considerable tarry materials from the solvent causing it to be black in color. Such discoloration is detrimental to the production of quality tar acid phenols. With the preliminary treatment method of the present invention, the quality of the carbolate product is greatly improved. For example, instead of being black in color, a product which is translucent with a light reddish coloration can be obtained.

For best results in the pretreatment procedure, it is desirable to employ a relatively small volume of light oil compared to the volume of the feed liquor. For example, from .1 to 5 parts of oil can be used per 100 parts of feed liquor. In commercial practice, about .5 to 2 parts of oil per 100 parts of feed liquor has been found to be satisfactory.

The emulsion layer resulting from the mixing of the light oil with the feed liquor will normally be of much smaller volume than the volume of the light oil phase. As indicated previously, the volume of the emulsion layer can be somewhat controlled by the proportion of tar in the light oil phase, since the presence of tars seems to promote the formation of the emulsion. Usually, an emulsion phase of sufficient volume can be readily obtained by a simple mixing operation such as that which would occur in mixer 32, and there is no need to employ special mixing devices. In fact, some of the advantages of the present invention could be achieved by simply mixing the feed and light oil within a decanter vessel, and then allowing the three phases to separate before withdrawing the purified feed liquor.

When the volume of the light oil employed in the pretreatment is relatively small compared to the volume of the feed liquor, there will not be an objectionable amount of phenol extracted from the aqueous liquor into the light oil. Any phenol present in the light oil after the pretreatment can be recovered by the reprocessing procedure previously described. In some cases it may even be desirable to use light oil in the pretreatment which has been previously saturated with phenol. For example, such oil could be obtained from line 26 in the illustration given.

The temperatures employed in the pretreatment procedure as described in the foregoing specification are not particularly critical. It will be readily apparent to those skilled in the art, however, that the temperature of the mixture introduced into decanter 34 should be sufficiently low that all of the components of the mixture will remain as liquids upon their release within the decanter. In the event that the temperature of the mixture is too high, it can easily be lowered by passing a suitable supply of coolant through heat exchanger 32. This reduction of temperature within the heat exchanger will not interfere with the desired mixing operation. Speaking generally, the temperature of the mixture as it is introduced in decanter 34 should be below the boiling point of the light oil. Usually temperatures within the range from 25 to 50° C. will be satisfactory. Since the raw ammoniacal liquor as it is supplied from the coking operation may be at a temperature of from 60 to 70° C., it will usually be desirable to reduce the temperature of the liquor by 10 to 20° C. In the illustration given, this is done in the mixer and heat exchanger unit 32.

*Example*

The method of the present invention was applied in a phenol extraction plant having a layout and apparatus components similar to the plant illustrated in the drawing. The ammoniacal liquor contained on the average of 1.7 grams per liter of phenols, and contained tar and carbonaceous impurities totaling at least 5 grams per liter. In the phenol recovery system, the ammoniacal liquor was supplied to the first extractor at the rate of 120 gallons per minute. A light oil, consisting of a mixture of benzol, toluol, xylol and carbon disulphide, was supplied to the same extractor at the rate of 140 gallons per minute. In the second extractor, the phenol-containing light oil was supplied at the rate of 140 gallons per minute. A 25% aqueous solution of sodium hydroxide was supplied to the second extractor at a rate sufficient to provide from .8 to 1 pound of caustic per pound of phenol. The dephenolized light oil from the second extractor was recycled to the first extractor, except for 1.4 gallons per minute which was bled off to be used in the pretreatment of the raw ammoniacal liquor. Make-up light oil was introduced into the system at the same rate to balance the amount withdrawn.

In the pretreatment procedure, the raw ammoniacal liquor was mixed with the light oil in the approximate proportions of 1 part of light oil per 100 parts of ammoniacal liquor, the respective specific feed rates being 1.4 gallons per minute of light oil and 120 gallons per minute of the feed liquor. The temperature of the ammoniacal liquor before mixing with the oil ranged from 60 to 70° C. The oil as bled off from the circulating system ranged in temperature from 40 to 50° C. The combined streams of light oil and feed liquor were passed through a multi-stage heat exchanger wherein the streams were intimately mixed and the temperature of the mixture reduced to from 40 to 50° C. This mixture was then introduced into a decanter like the one illustrated in the accompanying drawing. The emulsion and oil phases were removed from the upper portion of the decanter, and the detarred and decarbonized feed liquor was removed from the lower portion of the decanter.

The purified feed liquor thus obtained was found to be substantially entirely free of both tar and carbon. The amount present was so low that it was possible to keep the concentration of tar in the recycle light oil to less than 0.1%. There was found to be no appreciable accumulation of carbonaceous materials within either the first or second extractors. The carbolate product obtained from the second extractor was very light colored, indicating that it was substantially free of tars. The efficiency of the phenol extraction ranged from a low of about 98.5% to a high of 99%.

Prior to the installation of the pretreatment procedure, the same plant required frequent shutdowns for the removal of carbonaceous material from the rotors of the centrifugal extractors. Further, the concentration of tar in the recycled light oil ranged up to 20%. This caused the carbolate product to be dark colored and reduced its market value. Due to the high concentration of tar in the recycle light oil, the efficiency of the phenol extraction was sometimes as low as 88%.

While in the foregoing specification this invention has been described in relation to a preferred embodiment thereof and many details have been set forth for the purpose of illustration, it will be apparent that the invention is susceptible to other embodiments and that many of the details described herein can be varied widely without departing from the basic principles of the present invention. For example, the principles of this invention are conceived of as applicable to two phase systems other than the one described herein providing that the two phases are capable of inter-acting to produce an emulsion phase of intermediate density. Where the heavier of the two phases contains suspended solid particles, these particles can be collected and separated with the emulsion phase in a manner similar to that previously described herein.

I claim:

1. In conjunction with a process for recovering phenols from an aqueous ammoniacal feed liquor contaminated with carbon particles and tars wherein the phenols are extracted into a water-immiscible light oil by means of a centrifugal extractor, the phenols removed from the light oil within a second centrifugal extractor, and the dephenolized light oil recirculated to said first extractor, the improvement comprising bleeding off a portion of the light oil from said phenol recovery process, mixing the light oil thus obtained with the said ammoniacal feed liquor before said liquor is introduced into said first extractor, thereby forming an emulsion phase, the volume of said light oil being relatively small compared to the volume of said feed liquor, allowing said mixture to stratify with the oil and emulsion phases above the ammoniacal feed liquor, whereby the carbon particles collect in said emulsion phase, separating said emulsion phase from said ammoniacal feed liquor, and thereafter introducing the decarbonized ammoniacal feed liquor into said first extractor.

2. In the processing of coke plant aqueous liquors containing ammonia, phenols, and carbon particles wherein the phenols are extracted into a light oil selected from the group consisting of benzol, toluol, xylol, and mixtures thereof, the method of decarbonizing the liquors, comprising maintaining of a body of liquid composed of three vertically superimposed phase layers, an upper oil phase composed primarily of said light oil, an intermediate emulsion phase, and a lower aqueous phase, said aqueous phase containing ammonia and phenols, and said emulsion phase comprising a water emulsion of said light oil, introducing into the lowermost phase of said liquid body an unseparated three phase mixture having phases corresponding to each of phases of said liquid body, said three phase mixture having been obtained by mixing a light oil with said coke plant liquors, the oil phase of said mixture being of relatively small volume compared to the aqueous phase thereof and being composed primarily of a light oil selected from the group consisting of benzol, toluol, xylol and mixtures thereof, and the emulsion phase of said mixture being of relatively small volume compared to the oil phase thereof, said mixture also containing carbon particles coated with an emulsion of said light oil, allowing said mixture to separate within said liquid body, whereby each of the three phases of said liquid body is enlarged by the corresponding phase of said mixture, said carbon particles collecting in said intermediate emulsion layer, and withdrawing portions of the lowermost of said phases separately from the other two of said three phases.

3. In the processing of coke plant ammoniacal aqueous liquors containing dissolved phenol and suspended carbon and tar contaminants wherein the phenols are extracted into a light oil selected from the group consisting of benzol, toluol, xylol, and mixtures thereof, the method of removing the carbon and tar without appreciably reducing the phenol content of the liquors, comprising mixing said light oil with the said liquor prior to the extraction of the phenol from said liquor, said mixing being in proportions of about .1 to 5 parts of oil per 100 parts of said liquor, whereby the tars are dissolved in said oil, an oil-emulsion phase is formed and the carbon particles are coated with an emulsion of said oil without extracting more than a small proportion of the phenol from the aqueous liquor into the oil, holding the mixture in a confined body until it separates into an upper oil phase containing the dissolved tar, an intermediate emulsion phase containing the carbon particles, and a lower aqueous phase containing the dissolved phenol, and removing at least a portion of each of the two upper phases independently of the lower phase.

References Cited in the file of this patent

UNITED STATES PATENTS

| | | |
|---|---|---|
| 1,826,431 | Miller | Oct. 6, 1931 |
| 1,830,725 | Ulrich | Nov. 3, 1931 |
| 1,955,065 | Hawley | Apr. 17, 1934 |
| 2,761,563 | Waterman et al. | Sept. 4, 1956 |
| 2,768,977 | Auvil et al. | Oct. 30, 1956 |
| 2,825,678 | Jahnig et al. | Mar. 4, 1958 |